Figure 1:
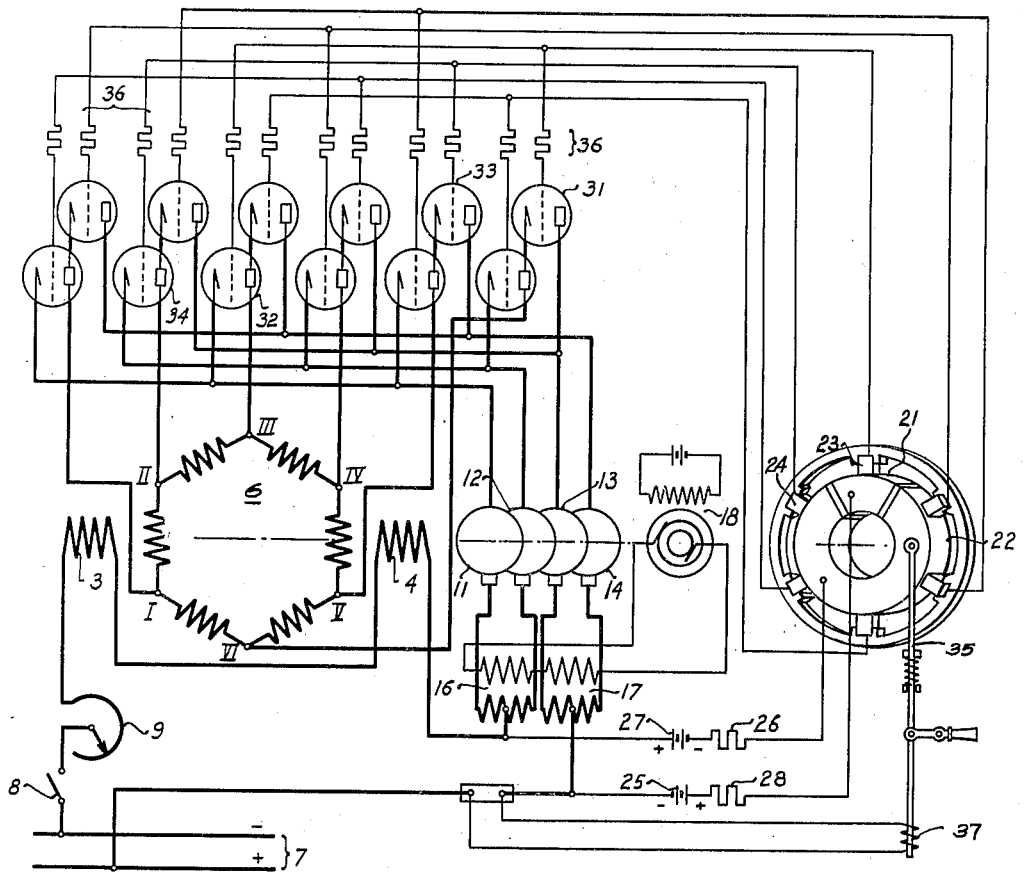

June 27, 1933.  E. KERN  1,915,790

DIRECT CURRENT COMMUTATING SYSTEM

Filed May 31, 1930

Inventor
Erwin Kern
By
Attorney

Patented June 27, 1933

1,915,790

UNITED STATES PATENT OFFICE

ERWIN KERN, OF WETTINGEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

DIRECT CURRENT COMMUTATING SYSTEM

Application filed May 31, 1930, Serial No. 457,778, and in Germany May 30, 1929.

(GRANTED UNDER SECTION 14, ACT OF MARCH 2, 1927, 357 O. G. 5)

This invention relates to improvements in devices for commutating direct current in which the operating voltage will not be limited by the voltage of each segment of the usual type of commutator and, therefore, by the number of segments available.

In direct current motors of the usual type, the characteristics of the motor are determined by the proportion of its several portions which cannot be usually modified as desired. To obtain different characteristics, the position of the brushes on the commutator may be varied either manually or in dependence on electrical or mechanical values of the structure. Such adjustment of the brushes has been found, heretofore, impossible to obtain because of the difficulties of commutation which could not be overcome. Another means for obtaining the above result was the shifting the position of the field relative to the neutral line of the armature, as for instance, by the variable excitation of a second set of field coils which means were, however, also unsuccessful because of commutation difficulties.

If, however, commutation is provided for by the use of controlled electric valves, such valves being conductive in only one direction, it is no longer necessary that the portions of the armature winding be commutated when passing thru a field of predetermined strength which is proportional to the current as will be seen from the following.

Consequently, in a direct current motor having electric valve commutation, the neutral line of the armature may be displaced as desired provided the field strength impressed on the armature is sufficient to produce a reversal of current. The usual controlled electron discharge tube may be used for such purposes without encountering any difficulties in operation but such tubes are impractical for many reasons inherent in the tube structure itself, chief of which is the limitation to small quantities of energy which may pass therethru.

The above difficulties of tube operation are not present in valves of other types such as grid controlled electric current rectifiers of the metallic vapor type or such as the so called thyratrons which are hot cathode grid controlled tubes in which the current passes through either a metallic vapor or a gaseous atmosphere; both types of tubes being capable of controlling large quantities of current. It is well known that in such tubes, however, although no current will flow as long as the grid is at negative potential relative to the cathode, the flow of current once started cannot be interrupted by use of the grid. It is, therefore, necessary to interrupt the current in the circuit by other means, such as the introduction of alternating voltages of suitable magnitude, after which passage of current can be prevented by maintaining the grid at negative potential with respect to the cathode. To commutate current in the armature of a direct current motor, as contemplated by the present invention, the source of current is connected to two points of the armature through electric valves and after a certain period of time is also connected to two different points of the armature through another set of valves. The current is then extinguished in the circuit connected with the first two points by making the grids of the valves negative and thereupon impressing thereon an alternating voltage of such magnitude as to interrupt the current in the circuit. The source is then connected to a third pair of armature points and the above cycle of operation is repeated. The current taken off at different points of the armature by the above method is variable but the total current is substantially constant.

It is therefore, among the objects of the present invention to provide a device for commutating direct current without regard to the number of segments of the usual type of commutators and their voltage as was the case heretofore.

Another object of the present invention is to provide a device for commutating direct current which device will employ electric valves to obtain the desired results.

Another object of the invention is to provide a device for commutating direct current in which mercury vapor arc devices controlled by grids or so-called thyratrons are used.

Another object of the invention is to provide a device for commutating direct current in which conductors are connected to the armature windings of a direct current motor and an alternating current is superimposed on such conductors to cause the direct current flowing therein to pass, periodically, through zero.

Another object of the invention is to provide a device for commutating direct current in which the characteristics of the motor, as determined by the proportions of the different portions thereof, may be varied manually or in dependence on electrical or mechanical values thereof.

Another object of the invention is to provide a device for commutating direct current in which the characteristics of the structure are variable by means of control grids of valves controlled by a movable commutator.

Another object of the invention is to provide a device for commutating direct current in which the characteristics thereof are changed by addition of one or more field windings excited in dependence on electrical or mechanical values of the same or of adjacent structures.

Figure 2:
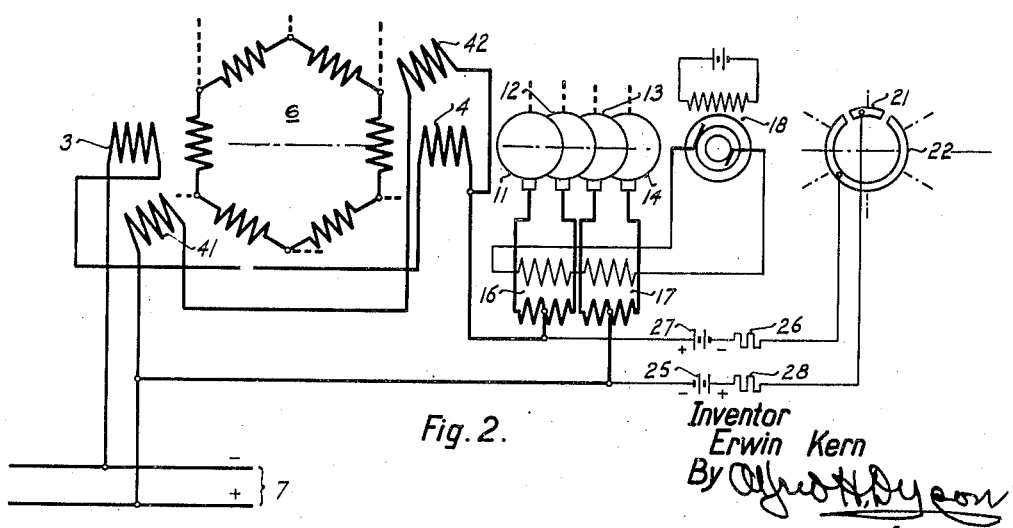

Objects and advantages, other than those above set forth, will be apparent from the following description when read in connection with the accompanying drawing in which Figure 1 diagrammatically illustrates one embodiment of the present invention and Fig. 2 diagrammatically illustrates a modified embodiment of the invention in which only such portions of Fig. 1 as are essential to the understanding of the modification are shown.

Referring more particularly to the drawing by characters of reference the reference numerals 3 and 4 designate the several portions of the stationary field and the reference numeral 6 designates the rotating armature of a direct current motor which is supplied with current from a source of supply 7 through a switch 8 and a rheostat 9 as is usual for controlling direct current motors. The armature winding 6 is shown as being divided into only 6 sections, although it is evident that it may be divided into any number of sections, which sections are connected at point I, point II, point III, point IV, point V, and point VI. It is evident that the motor may also be constructed with a fixed armature and a rotating field, the portion of the structure to be described being correspondingly movable or stationary so as to maintain the mechanical relations thereof.

A plurality of slip rings, 11, 12, 13 and 14 are mounted on the shaft (not shown) of the armature 6 and are connected through brushes with the secondary windings of transformers 16 and 17, the primary windings of which are connected with and supplied with alternating current of suitable frequency from an alternator 18, also mounted on the shaft of the motor. The primary windings of the transformers 16 and 17 are connected in series to obtain an absolute equality of alternating current amplitude. A commutator, divided into two segments 21 and 22 is mounted adjacent the motor shaft in such position as to permit rotation of brushes as at 23 and 24, by the motor shaft, on the commutator. The commutator segment 21 is connected through a resistance 28 to the positive side of a battery 25 and with the slip rings 13 and 14 and the segment 22 thereof is connected through a resistance 26 and to the negative side of a battery 27 and with the secondary winding of a transformer 17 and, therefore, with the slip rings 11 and 12.

The various points of connection designated by the roman numerals, of the armature winding are connected with pairs of vapor or gas filled electric valves as shown at 31, 32, 33 and 34 and the grids of the valves are connected through resistance 36 with brushes 23, 24 etc., rotating on the commutator. It will be seen that each of the armature winding connection points is connected with one pair of valves which are so connected that one valve of the pair functions to allow current to flow only into the armature and the other valve of the pair functions to allow current to flow only out of the armature windings.

In operation, the device passes through a constantly recurring cycle of operations, to be now particularly described in the rotation of the armature winding, which brings the connection points thereof to the same point successively with relation to the field. When the entire device is in the position shown in the drawing, the motor may be started by closing of the switch 8 and regulated by adjustment of the rheostat 9 as is usual. A circuit is complete from the source of direct current 7 through the secondary winding of the transformer 17, over the slip ring 13, the valve 31, to the point VI of the armature winding 6, through the winding 6 in both directions to the point III, through valve 32 to slip ring 11, through transformer secondary winding 16, field windings 4 and 3, rheostat 9, and switch 8 to the line 7. The grids of the valves 31 and 32 are supplied with a positive bias from the battery 25 through the commutator segment 21 and brush 23 in contact therewith at the position shown in the drawing. All of the other valve grids are given a negative bias from the battery 27 through a resistance 26, commutator segment 22 and the brushes resting thereon, thereby preventing the flow of current to the several negatively biased tubes or valves.

During the next moment of operation the armature and the commutator will have rotated sufficiently to bring point V midway between its location shown in the drawing and that shown for point VI and the brushes 23 and 24 will have been so rotated as to be both in contact with the segment 21. A circuit is then completed from the direct current supply line 7 to the secondary winding of the transformer 17, over the slip rings 13 and 14, through valves 31 and 33, to the armature winding connection points V and VI, through winding 6 to the points II and III, through valves 32 and 34 to the slip rings 11 and 12, through the secondary winding of the transformer 16, fields 4 and 3, rheostat 9 and switch 8 to the line 7. The grids of the valves 31, 32, 33 and 34 are supplied with a positive bias from the battery 25 through the commutator segment 21 and the brushes 23 and 24 contacting therewith. All of the other valve grids are negative as above described.

During the next moment of rotation of the armature and of the brushes, point V will have been brought to the position shown in the drawing for point VI and brush 23 will have rotated sufficiently to contact with commutator segment 22 on which a negative bias is impressed from the battery 27. A circuit is completed from the direct current supply line 7 through the secondary windings of the transformer 17, the slip ring 14, the valve 33 to point V, through the winding 6 in both directions to the point II thereof, through the valve 34 over the slip ring 12, through the secondary of the transformer 16, fields 4 and 3 rheostat 9 and switch 8 to the supply line 7. The grids of valves 33 and 34 have a positive bias impressed thereon and all of the other valve grids are negative as respects the cathode as above described.

It will be seen that in the first position considered, the grids of valves 31 and 32 are positive and the grids of valves 33 and 34 are negative; while in the second position the grids of valves 33 and 34 become positive, while the grids of valves 31 and 32 become negative but the current continues to flow through the valves 31 and 32 until the voltages induced in the secondary winding of the transformers 16 and 17 by the alternator have balanced the difference of counter electromotive forces produced in the two circuits by the armature. Once interrupted the current in the first circuit cannot pick up again until the grids of valves 31 and 32 are again positive.

Two embodiments of means are shown by which the neutral line of the armature winding may be manually or automatically displaced in dependence on current, voltage or load or any other desired value with respect to the axis of the field winding. As shown in Fig. 1, a grid control commutator is provided with a jointed lever 35 by which the commutator may be manually shifted and the lever 35 is also provided with a portion forming a core for a coil 37 which is shown as connected across a shunt in circuit with the direct current line 7 but which may be connected with any portion of the structure whereby the coil will be energized by a predetermined range of values.

Fig. 2 illustrates the use of a second or additional set of field windings 41 and 42 which are displaced relative to the main field winding 3 and 4 and which are supplied in dependence on the current or voltage of the motor with electrical values other than those of the main field winding and which may be either manually or automatically regulated to obtain values different from those present in the windings 3 and 4.

Although but two embodiments of the present invention have been illustrated and described, it will be apparent to those skilled in the art that various changes and modifications may be made therein without departing from the spirit of the invention or from the scope of the appended claims.

The invention claimed is:—

1. In a direct current motor, an armature winding divided into a plurality of sections, series and shunt connected field windings arranged adjacent said armature winding, electric valves connected with the sections of said armature winding, a source of alternating current, a plurality of slip rings connected between said valves and said source of alternating current, transformers connecting said slip rings and said source of alternating current, a source of direct current connected with the secondary windings of said transformers, a substantially stationary commutator divided into segments, sources of direct current of different polarity connected with the segments of said commutator, and brushes rotative into contact with the said segments of said commutator and connected with said valves to impress a bias on the grids thereof to thereby cause the angular displacement of the neutral line of the armature winding relative to the field windings in dependence upon the movements of connections of said brushes with the said segments and in dependence upon the relative excitations of the said field windings.

2. In a direct current motor, an armature winding divided into a plurality of sections, series and shunt connected field windings arranged adjacent said armature winding, electric valves connected with the sections of said armature winding, a source of alternating current, a plurality of slip rings connected between said valves and said source of alternating current, a source of direct current connected with said slip rings, and means for variably displacing the neutral line of the armature winding with respect to said field windings in dependence upon the excitation of the said shunt winding relative to the excitation of the said series winding to adjust the characteristics of the motor within wide limits.

3. In a direct current motor, an armature winding divided into a plurality of sections, field windings arranged adjacent said armature winding, electric valves connected with the sections of said armature winding, a source of alternating current, a plurality of slip rings connected between said valves and said source of alternating current, a source of direct current connected with said slip rings, and means for automatically displacing the neutral line of said armature winding with respect to the axes of said field winding responsive to predetermined operating characteristics of the motor.

4. In combination with an electric motor comprising an armature winding divided into a plurality of sections, and a plurality of field windings connected in series and in shunt respectively with said armature winding, of a source of direct current for operating said motor, a source of alternating current superimposed upon the said direct current, a plurality of electric valves connected with said sources and with said windings and disposed to control the flow of said currents sequentially therethrough to said windings, means operative to control the said flow of said currents through the said valves, and means operative to affect the operation of the first said means in such manner as to vary the periods of said sequential flow of said currents through said valves to said windings to thereby adjust the operating characteristics of the said armature winding with respect to the operating characteristics of the said field windings in dependence upon the degree of excitation of said shunt connected winding relative to the degree of excitation of said series connected winding.

5. In combination with an electric motor comprising an armature winding divided into a plurality of sections, and compound field windings arranged in operative relation with said armature winding, of a source of direct current for operating said motor, a source of alternating current superimposed upon the said direct current, a plurality of electric valves connected with said sources and with said windings and disposed to control the flow of said currents sequentially therethrough to the said windings, means adjustable to a plurality of positions and operative thereat to vary the periods of the flow of said currents sequentially through said valves to the said windings to thereby adjust the operating characteristics of the said sections of the said armature winding relative to the operating characteristics of the said field windings.

6. In combination with an electric motor comprising an armature winding divided into sections, and a field winding arranged in operative relation with said armature winding, of a source of direct current for operating the said motor, a plurality of electric valves connected with said source and with the said windings, the said valves being disposed to control the flow of said current therethrough to the said windings, a source of alternating current, means operative to superimpose the said alternating current upon said direct current to affect the said flow of said direct current through the said valves, control means operative to adjust the operating characteristics of the said sections of the said armature winding relative to the operating characteristics of the said field winding, the last said means being adjustable in dependence upon the said flow of said direct current through said valves.

7. In combination with an electric motor comprising an armature winding divided into a plurality of sections, and a field winding arranged in operative relation to said armature winding, of a source of direct current for operating said motor, a plurality of electric valves disposed to connect the said source of current with the said windings, a source of alternating current, means operative to superimpose the said alternating current upon the said direct current and operative to affect the flow of said direct current to said windings by way of said valves, control means operative to adjust the said flow of said currents by way of said valves, the last said means including a coil winding operative to adjust the said control means in dependence upon the said flow of the said direct current to the said valves.

8. In combination with an electric motor comprising an armature winding divided into a plurality of sections, a series connected field winding, and a shunt connected field winding arranged in operative relation to the said armature winding, a source of direct current for operating the said motor, a plurality of electric valves continuously connected with said source and with the said windings to control the flow of said current sequentially through said valves to said windings, a source of alternating current, a plurality of transformers connected with said source of alternating current and having a winding connected in circuit with the said source of direct current whereby the said source of alternating current is superimposed upon the said direct current and operative thereby to affect the flow of said direct current through the said valves to the said windings, a control electrode for each of said valves, a plurality of auxiliary sources of direct current, means for connecting each of said auxiliary sources with each of said control electrodes to affect the said flow of current sequentially through the said valves to the said windings, and means operative to a plurality of positions to affect the first said means to vary the said connections of the said auxiliary sources to thereby vary the periods of the sequential flow of current through said valve whereby the operating characteristics of the said armature winding is adjusted relative to the operating characteristics of the said field winding in dependence upon the degree of excitation of said series connected winding relative to the degree of excitation of said shunt connected winding.

9. In combination with an electric motor comprising an armature winding divided into sections, a series connected field winding, and a shunt connected field winding arranged in operative relation with the said armature winding, a source of direct current for operating the said motor, a plurality of electric valves continuously connected with said source of current and with the said sections of the said armature winding and operable to control the flow of said current sequentially through said valves and through said windings, a source of alternating current, means operative to effect superimposition of said alternating current upon said direct current, the said alternating current being effective to affect the said flow of said direct current through said valves to the said windings, each said valve including means operative to affect the flow of said currents sequentially through said valves to said windings, a commutator comprising a plurality of segments, a plurality of auxiliary sources of current connected with the said segments, a plurality of brushes rotative into contact with said segments and operative to connect the said auxiliary sources of current sequentially with the said means, and means operative to rotate the said commutator to vary the periods of connections of said auxiliary sources with the first said means to thereby adjust the operating characteristics of said armature winding relative to the operating characteristics of said field windings in dependence upon the degree of excitation of said series connected winding relative to the degree of excitation of said shunt connected winding.

In testimony whereof I have hereunto subscribed my name this 17th day of May, A. D. 1930.

ERWIN KERN.